US012554356B2

(12) United States Patent
Jung et al.

(10) Patent No.: US 12,554,356 B2
(45) Date of Patent: Feb. 17, 2026

(54) TOUCH DEVICE, TOUCH SYSTEM INCLUDING THE SAME, AND DRIVING METHOD OF THE TOUCH DEVICE

(71) Applicant: Samsung Display Co., Ltd., Yongin-si (KR)

(72) Inventors: Keum Dong Jung, Yongin-si (KR); Jang Hui Kim, Yongin-si (KR); Sang Hun Park, Yongin-si (KR); Yong Sub So, Yongin-si (KR); Da Eun Yi, Yongin-si (KR); Bo Hwan Lee, Yongin-si (KR); Byeong Kyu Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/508,163

(22) Filed: Nov. 13, 2023

(65) Prior Publication Data
US 2024/0370115 A1    Nov. 7, 2024

(30) Foreign Application Priority Data

May 2, 2023    (KR) .................. 10-2023-0057254

(51) Int. Cl.
*G06F 3/041*    (2006.01)
*G06F 3/0354*    (2013.01)
(Continued)

(52) U.S. Cl.
CPC ...... *G06F 3/04162* (2019.05); *G06F 3/03545* (2013.01); *G06F 3/0441* (2019.05);
(Continued)

(58) Field of Classification Search
CPC ............ G06F 3/04162; G06F 3/03545; G06F 3/0441; G06F 3/0442; G06F 3/0446;
(Continued)

(56) References Cited

U.S. PATENT DOCUMENTS 7,864,160 B2    1/2011    Geaghan et al.
RE42,738 E    9/2011    Williams
(Continued)

FOREIGN PATENT DOCUMENTS

KR    10-2013-0056445 A    5/2013
KR    10-1519225 B1    5/2015
(Continued)

OTHER PUBLICATIONS

US Office Action dated Oct. 23, 2024, issued in U.S. Appl. No. 18/589,620 (11 pages).
(Continued)

*Primary Examiner* — Temesghen Ghebretinsae
*Assistant Examiner* — Sosina Abebe
(74) *Attorney, Agent, or Firm* — Womble Bond Dickinson (US) LLP

(57) ABSTRACT

A touch device includes a touch panel including touch electrodes, and a touch driver adjacent to the touch panel, configured to sense a touch of a user, configured to transmit uplink signals including position information of the touch electrodes to an active pen through at least some of the touch electrodes in a first touch period, and configured to receive a sensing signal including position information of the active pen, which is calculated using the uplink signals, from the active pen in a second touch period after the first touch period.

15 Claims, 14 Drawing Sheets

(51) Int. Cl.
*G06F 3/044* (2006.01)
*H04W 4/80* (2018.01)
*H04W 72/21* (2023.01)
*H04W 72/23* (2023.01)

(52) U.S. Cl.
CPC .......... *G06F 3/0442* (2019.05); *G06F 3/0446* (2019.05); *H04W 4/80* (2018.02); *H04W 72/21* (2023.01); *H04W 72/23* (2023.01)

(58) Field of Classification Search
CPC ............... G06F 3/04166; G06F 3/0412; G06F 2203/04114; H04W 4/80; H04W 72/21; H04W 72/23
See application file for complete search history.

(56) References Cited

U.S. PATENT DOCUMENTS

| | | | |
|---|---|---|---|
| 9,616,982 | B2 | 4/2017 | Hollis et al. |
| 10,254,891 | B2 | 4/2019 | Noh |
| 10,268,285 | B2 | 4/2019 | Jung et al. |
| 10,366,264 | B2 | 7/2019 | Kim et al. |
| 10,838,546 | B2 | 11/2020 | Choi |
| 10,936,101 | B2 | 3/2021 | Lee et al. |
| 11,656,729 | B2 | 5/2023 | Park et al. |
| 11,829,549 | B2 | 11/2023 | Chen et al. |
| 2017/0285771 | A1 | 10/2017 | Jung et al. |
| 2018/0188836 | A1 | 7/2018 | Park |
| 2019/0179475 | A1* | 6/2019 | Seo ....................... G06F 3/0442 |
| 2020/0004367 | A1 | 1/2020 | Lee et al. |
| 2020/0201505 | A1* | 6/2020 | Jung ..................... G06F 3/0383 |
| 2021/0019019 | A1* | 1/2021 | Zhang ................ G06F 3/03545 |
| 2021/0397298 | A1 | 12/2021 | Choi et al. |
| 2022/0019331 | A1* | 1/2022 | Park ..................... G06F 3/04184 |
| 2022/0043537 | A1 | 2/2022 | Lee et al. |
| 2022/0171514 | A1* | 6/2022 | Kim ....................... G06F 3/0383 |
| 2022/0334698 | A1 | 10/2022 | Gur et al. |
| 2023/0236677 | A1* | 7/2023 | Cheng ................. G06F 3/04166 345/179 |
| 2024/0077975 | A1* | 3/2024 | Lee ....................... G06F 3/0442 |
| 2024/0153449 | A1 | 5/2024 | Zhong et al. |
| 2024/0377909 | A1 | 11/2024 | Jung et al. |

FOREIGN PATENT DOCUMENTS

| | | |
|---|---|---|
| KR | 10-2020-0009453 A | 1/2020 |
| KR | 10-2238697 B1 | 4/2021 |
| KR | 10-2022-0018364 A | 2/2022 |
| KR | 10-2364099 B1 | 2/2022 |
| KR | 10-2409949 B1 | 6/2022 |
| KR | 10-2022-0112574 A | 8/2022 |
| KR | 10-2460552 B1 | 10/2022 |

OTHER PUBLICATIONS

US Office Action dated Feb. 20, 2025, issued in U.S. Appl. No. 18/419,386 (25 pages).

US Office Action dated May 8, 2025, issued in U.S. Appl. No. 18/592,254 (10 pages).

US Final Office Action dated Sep. 3, 2025, issued in U.S. Appl. No. 18/419,386 (18 pages).

US Notice of Allowance dated Sep. 10, 2025, issued in U.S. Appl. No. 18/592,254 (9 pages).

* cited by examiner

TOUCH DEVICE, TOUCH SYSTEM INCLUDING THE SAME, AND DRIVING METHOD OF THE TOUCH DEVICE

CROSS-REFERENCE TO RELATED APPLICATION

The present application claims priority to, and the benefit of, Korean Patent Application No. 10-2023-0057254, filed on May 2, 2023, in the Korean Intellectual Property Office, the content of which in its entirety is herein incorporated by reference.

BACKGROUND

1. Field

The present disclosure relates to a touch device for sensing a touch of a user by using touch electrodes, a touch system including the touch device, and a driving method of the touch device.

2. Description of Related Art

Electronic devices are widely used, and have touch panels mounted therein to have a function capable of indicating a position through a touch. For example, as mobile electronic devices, such as smartphones and tablet computers, come into use, touch panels are widely used. Recently, demands for a technique for allowing a touch panel to recognize a touch by using another tool, such as an active pen in addition to a finger, have increased.

However, it may be difficult for electronic devices to effectively provide both a touch of a finger or the like and a touch of an active pen while basically providing a display function. For example, as displays of electronic devices tend to become large in size and become high speed, sensing performance for allowing a touch panel to recognize a touch may be deteriorated. This may cause deterioration of the reliability of operations of touch devices, display devices, and electronic devices.

SUMMARY

Embodiments provide a touch device and a touch system, which can recognize an active pen with improved reliability.

Embodiments also provide a driving method of the touch device.

In accordance with an aspect of the present disclosure, there is provided a touch device including a touch panel including touch electrodes, and a touch driver adjacent to the touch panel, configured to sense a touch of a user, configured to transmit uplink signals including position information of the touch electrodes to an active pen through at least some of the touch electrodes in a first touch period, and configured to receive a sensing signal including position information of the active pen, which is calculated using the uplink signals, from the active pen in a second touch period after the first touch period.

The touch electrodes may include first touch electrodes extending in a first direction, and second touch electrodes extending in a second direction, wherein the touch driver is configured to generate the uplink signals by encoding position information of the first touch electrodes and the second touch electrodes.

The touch driver may be configured to select one or more touch electrodes corresponding to a range with respect to a final position at which the touch is sensed among the touch electrodes, and to transmit the uplink signals through the touch electrodes.

A driving mode of the touch driver may include a pen mode and a touch mode, wherein the touch device includes a switch circuit configured to selectively apply a signal transferred through one signal line to two or more of the touch electrodes during the pen mode.

The touch panel may include pads connected to the touch electrodes, wherein the switch circuit is located between the pads and the touch electrodes.

A driving mode of the touch driver may include a pen mode and a touch mode, wherein the touch electrodes include touch electrode groups, and wherein the touch device includes a switch circuit configured to selectively connect respective touch electrodes of the touch electrode groups to each other according to a change in the driving mode.

The sensing signal may include position information of the active pen and pen information of the active pen, and may be configured to be transmitted from the active pen to the touch driver using a Bluetooth® wireless technology scheme.

The sensing signal may include position information of the active pen and pen information of the active pen, and may be configured to be transmitted as a downlink signal from the active pen to the touch driver through the touch electrodes.

In accordance with another aspect of the present disclosure, there is provided a touch system including a touch device including a touch panel including touch electrodes, and a touch driver adjacent the touch panel and configured to sense a touch of a user, and an active pen configured to communicate with the touch device through the touch panel, wherein the touch driver is configured to transmit an uplink signal including position information to the active pen through at least some of the touch electrodes in a first touch period, and is configured to receive a sensing signal including position information of the active pen from the active pen in a second touch period after the first touch period, and wherein the active pen further includes a sensing driver configured to calculate the position information of the active pen by using the uplink signals received through capacitors generated between at least some of the touch electrodes and the active pen.

The touch driver may be configured to generate the uplink signal by encoding position information of first touch electrodes and second touch electrodes, wherein the uplink signal is configured to be received from respective ones of the touch electrodes adjacent to the active pen, and wherein the sensing driver is configured to calculate the position information of the active pen by decoding the uplink signals.

The uplink signals may include a digital component representing position information of one of the touch electrodes transmitting a corresponding uplink signal and an analog component according to capacitance information of a capacitor between the one of the touch electrodes and the active pen.

The sensing driver may be configured to calculate the position information of the active pen by separating the digital component and the analog component from each other using an algorithm.

The touch driver may be configured to select one or more of the touch electrodes corresponding to a range with respect to a final position at which the touch is sensed, and to transmit the uplink signal through the one or more of the touch electrodes.

A driving mode of the touch driver may include a pen mode and a touch mode, wherein the touch system includes a switch circuit configured to selectively apply a signal transferred through one signal line to two or more of the touch electrodes during the pen mode.

The sensing signal may include position information of the active pen and pen information of the active pen, wherein the sensing driver is configured to transmit the sensing signal using a Bluetooth® wireless technology scheme.

In accordance with still another aspect of the present disclosure, there is provided a method of driving a touch device, the method including in a first touch period, transmitting uplink signals including position information to an active pen through at least some of touch electrodes of a touch panel, and in a second touch period after the first touch period, receiving position information of the active pen, which is calculated using the uplink signals, from the active pen, wherein the position information of the active pen is calculated using the uplink signals received through capacitors generated between the at least some of the touch electrodes and the active pen.

BRIEF DESCRIPTION OF THE DRAWINGS

Embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the embodiments to those skilled in the art.

DETAILED DESCRIPTION

Figure 1:
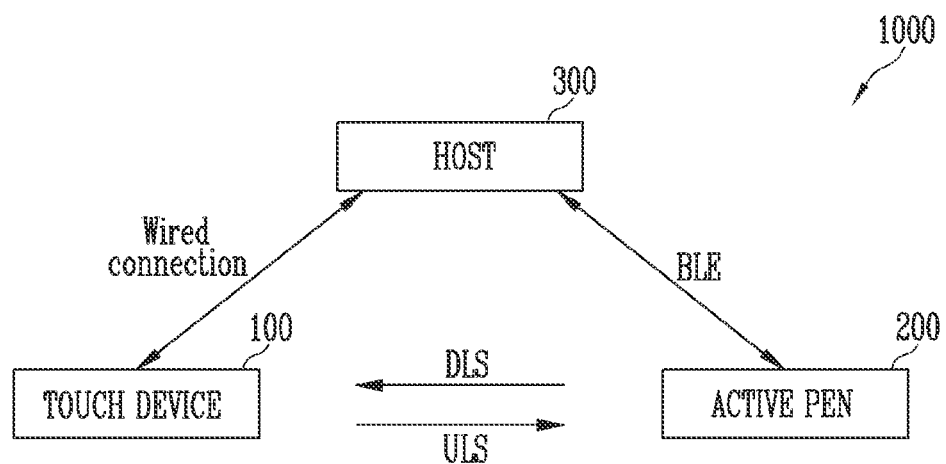
FIG. 1 is a block diagram illustrating a touch system in accordance with one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The present disclosure covers all modifications, equivalents, and replacements within the idea and technical scope of the present disclosure. Further, each of the features of the various embodiments of the present disclosure may be combined or combined with each other, in part or in whole, and technically various interlocking and driving are possible. Each embodiment may be implemented independently of each other or may be implemented together in an association.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components such as "between," "immediately between" or "adjacent to" and "directly adjacent to" may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression such as "at least one of A and B" and "at least one of A or B" may include A, B, or A and B. As used herein, "or" generally means "and/or," and the term "and/or" includes any and all combinations of one or more of the associated listed items. For example, the expression such as "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a touch system in accordance with one or more embodiments of the present disclosure.

Referring to FIG. 1, the touch system 1000 may include a touch device 100, an active pen 200, and a host 300.

Figure 2:
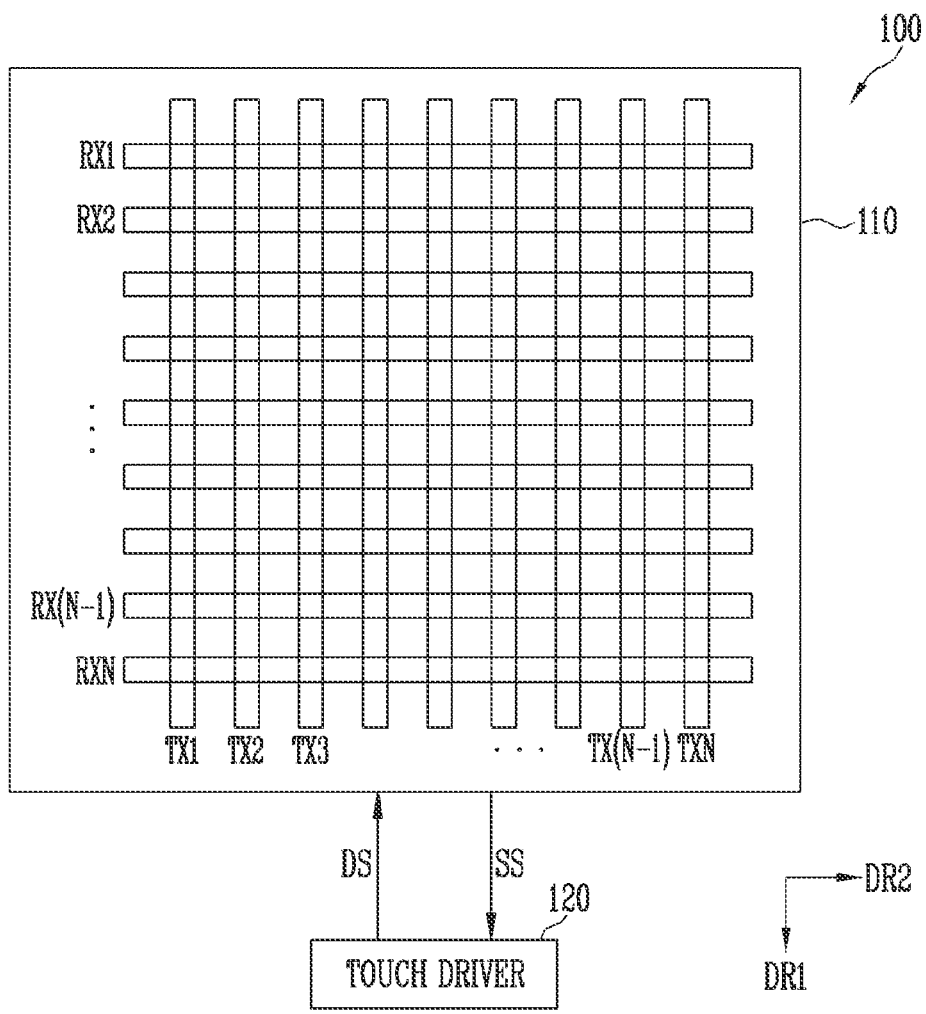
FIG. 2 is a block diagram illustrating one or more embodiments of a touch device shown in FIG. 1.

The touch device 100 may include a touch panel 110 (see FIG. 2) and a touch driver 120 (see FIG. 2). The touch driver 120 may generate uplink signals for the purpose of communication with the active pen 200, and the generated uplink signals may be transmitted to the active pen 200, using capacitive coupling, through a plurality of touch electrodes located in the touch panel 110. As such, each uplink signal may be transferred to the active pen 200 through a capacitor formed between the touch electrode of the touch panel 110 and the active pen 200. For example, the uplink signals may be signals which further include information of the touch panel 110, protocol information, synchronization information, and the like, in addition to position information of the touch electrodes.

In addition, the active pen 200 may generate a downlink signal for the purpose of communication with the touch driver 120, and the generated downlink signal may be transmitted to the touch driver 120, using the capacitive coupling, through at least one of the plurality of touch electrodes located in the touch panel 110. For example, the downlink signal may be a sensing signal including position information of the active pen, which is calculated through at least one of the transmitted uplink signals, pen information of the active pen, and various additional information.

The host 300 may include an internal memory, at least one processor, and an interface. The host 300 may perform several functions for the touch device 100 by executing several software programs through the processor, and may perform processing and control for data communication. Also, the host 300 may perform communication with an arbitrary external device and/or an arbitrary external system through various types of interfaces. That is, the touch device 100 may perform communication with the active pen 200 through the host 300. For example, the host 300 may include a transmission device for performing communication by using a serial communication scheme for direct connection, such as a serial bus (I2C), a universal serial bus (USB), a serial peripheral interface (SPI), or RS-232 and a wireless communication scheme for indirect connection, such as Bluetooth® (Bluetooth® being a registered trademark of Bluetooth Sig, Inc., Kirkland, WA) (e.g., low power Bluetooth®), Wi-Fi-Direct® (Wi-Fi-Direct® being a registered trademark of the non-profit Wi-Fi Alliance), IrDA LAN, or WAN, and may perform communication with the active pen 200 through the transmission device.

As shown in FIG. 1, the touch device 100 may transmit uplink signals ULS to the active pen 200, and the active pen 200 may receive the uplink signals ULS. In addition, the active pen 200 may calculate position information of the active pen by using the uplink signals ULS. The active pen 200 may transmit a sensing signal including the calculated position information of the active pen as a downlink signal DLS to the touch device 100, or may transmit the sensing signal to the host 300 through a Bluetooth® wireless technology scheme. The host 300 is wire-connected to the touch device 100. For example, the host 300 along with the touch device 100 may be included in a computing device, such as a computer, a notebook computer, a mobile phone, a smartphone, or a wearable device. For example, when the active pen 200 transmits the sensing signal to the host 300 through the Bluetooth® wireless technology scheme, the host 300 may re-transmit the sensing signal transmitted from the active pen 200 to the touch device 100 through the serial communication scheme.

FIG. 2 is a block diagram illustrating one or more embodiments of the touch device shown in FIG. 1.

Referring to FIG. 2, the touch device 100 may include a touch panel 110 and a touch driver 120.

In one or more embodiments, the touch panel 110 may include a plurality of touch electrodes and a plurality of touch lines connecting the touch electrodes to the touch driver 120. The touch electrodes may be located on the touch panel 110, or may be built in the touch panel 110 to be used for display driving, or may be separately located for the purpose of touch sensing. Also, the touch electrodes may have a transparent cylindrical electrode shape, or may have an opaque mesh shape. However, the present disclosure is not limited thereto. In addition, the touch driver 120 may be integrated with a touch integrated circuit (TIC) for driving the touch panel 110 into one IC, or may be configured as a separate IC for individually generating an uplink signal.

In one or more embodiments, the touch panel 110 may include first touch electrodes TX1, TX2, TX3, . . . , TX(N−1), and TXN extending in a first direction DR1 and second touch electrodes RX1, RX2, . . . , RX(N−1), and RXN extending in a second direction DR2 (N is a positive integer). For example, the first touch electrodes may be provided as first to Nth scan electrodes. In addition, the second touch electrodes may be provided as first to Nth sensing electrodes. The first touch electrodes TX1 to TXN may extend in the first direction DR1, and may be arranged in the second direction DR2. The second touch electrodes RX1 to RXN may extend in the second direction DR2, and may be arranged in the first direction DR1. The first touch electrodes TX1 to TXN and the second touch electrodes RX1 to RXN may be electrically separated from each other while crossing each other in plan view. Through the first touch electrodes TX1 to TXN and the second touch electrodes RX1 to RXN, uplink signals may be transmitted to the active pen 200, and a sensing signal may be received from the active pen 200.

In one or more embodiments, the touch driver 120 may drive touch electrodes by using a touch driving signal. The touch driving signal may include a driving signal DS, and may be a signal separate from the driving signal DS. The driving signal DS may be a signal including position information of each touch electrode, which is suitable to generate the sensing signal in the active pen 200. For example, the touch driver 120 may independently control the driving signal DS applied to each touch electrode, so that an uplink signal including the position information of each touch electrode is transmitted to the active pen 200 through each touch electrode. Accordingly, the sensing performance of a pen touch can be improved.

The touch driver 120 applies (e.g., to each touch electrode), a driving signal DS including position information of each touch electrode, so that an uplink signal can be transmitted to the active pen 200. For example, the touch driver 120 may generate a driving signal DS by encoding position information of each of the first touch electrodes and the second touch electrodes in the driving signal DS, and the generated driving signal DS may be transferred to the active pen 200 in the form of uplink signals through corresponding touch electrodes. For example, the uplink signals may be transferred through capacitors formed between the corresponding touch electrodes and the active pen 200. Also, the touch driver 120 may receive a sensing signal SS in the form of a downlink signal from the active pen 200 through touch electrodes adjacent to the active pen 200. The touch driver 120 may receive position information of the active pen 200, which is calculated in the active pen 200 by the received sensing signal SS.

Figure 3:
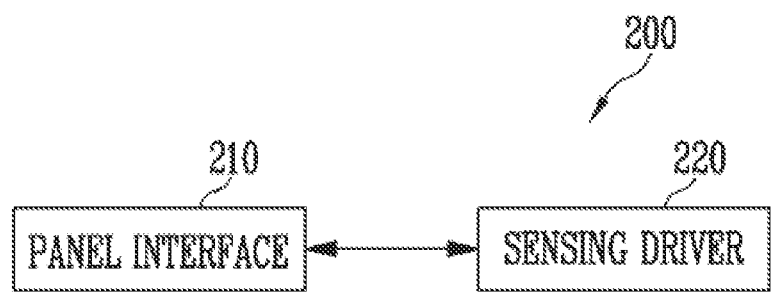
FIG. 3 is a block diagram illustrating one or more embodiments of an active pen shown in FIG. 1.

FIG. 3 is a block diagram illustrating one or more embodiments of the active pen shown in FIG. 1.

Referring to FIG. 3, the active pen 200 may include a panel interface 210 and a sensing driver 220. Unlike a general passive pen, the active pen 200 may include the panel interface 210 that receives information from the touch device 100 and that transmits information to the touch device 100. Also, the active pen 200 may include the sensing driver 220 that senses position information with which a touch occurs. To this end, the active pen 200 may further include an input button, a transceiver, a logic circuit, a memory, and the like.

The panel interface 210 may be operated while interlocking with the touch device 100, and may include a conductive tip for receiving uplink signals transmitted from the touch device 100. Also, the panel interface 210 may include a receiving circuit for receiving the received uplink signals, and may include a transmitting circuit for transmitting a sensing signal as a downlink signal. In other words, the panel interface 210 may include a separate transmission device that receives an uplink signal and that transmits a sensing signal.

The sensing driver 220 may entirely control the receiving circuit and the transmission circuit, and may control an operation of calculating position information of the active pen. The sensing driver 220 may calculate position information of the active pen by decoding the received uplink signals. Each of the received uplink signals may include a digital component representing position information of a touch electrode that transmits the corresponding uplink signal, and may also include an analog component according to capacitance information of a capacitor formed between the touch electrode transmitting the corresponding uplink signal and the active pen. Accordingly, the sensing driver 220 may decode the received uplink signals, and may separate each of the decoded uplink signals into a digital component and an analog component, using an algorithm (e.g., a predetermined algorithm), thereby calculating the position information of the active pen 200.

In embodiments, the sensing driver 220 may detect an uplink signal having largest capacitance information among the received uplink signals, and may calculate a weighted average by allocating a weighted value (e.g., a predetermined weighted value) to each of the received uplink signals through a touch electrode transmitting the corresponding uplink signal and touch electrodes adjacent thereto, so that the position information of the active pen 200 is calculated. The sensing driver 220 may employ at least one of various algorithms capable of separating digital components including position information of touch electrodes in the received uplink signals.

Figure 4:
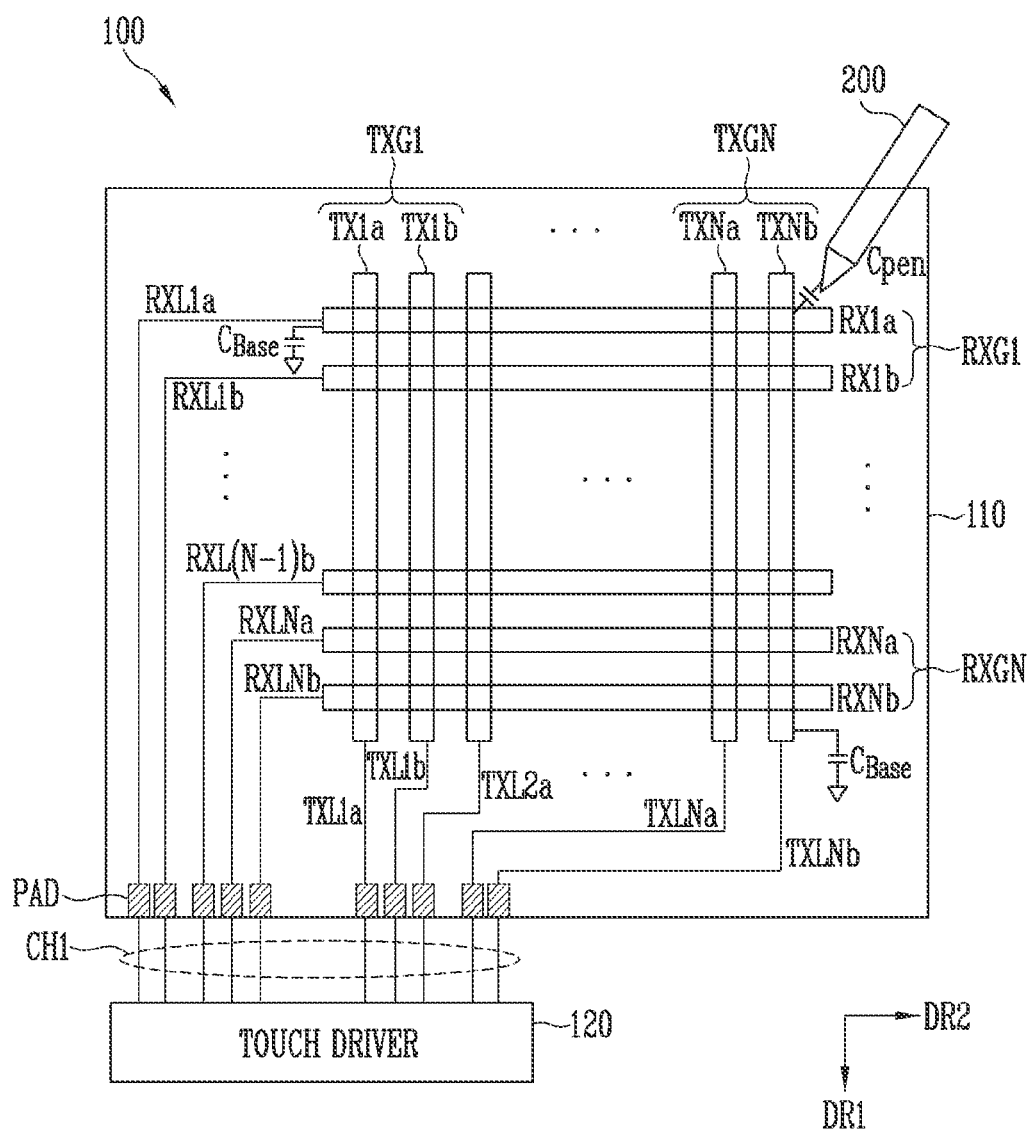
FIG. 4 is a block diagram illustrating one or more other embodiments of the touch device shown in FIG. 1.

FIG. 4 is a block diagram illustrating one or more other embodiments of the touch device shown in FIG. 1.

The touch device 100 may operate by changing a driving mode to a pen mode or a touch mode. The touch device 100 may change the driving mode to the pen mode or the touch mode by dividing or connecting the touch electrodes included in the touch panel 110 through the touch driver 120.

The touch panel 110 may include first to Nth touch electrode groups TXG1 to TXGN, and may include first to Nth sensing electrode groups RXG1 to RXGN. In addition, each of the first to Nth touch electrode groups TXG1 to TXGN may include two or more first touch electrodes, and each of the first to Nth sensing electrode groups RXG1 to RXGN may include two or more second touch electrodes.

When the driving mode is the touch mode, the touch driver 120 may apply a driving signal to touch electrodes by using a touch electrode group as a unit. The touch driver 120 may apply a signal transferred through one signal line to all touch electrodes included in one touch electrode group. The touch driver 120 may apply driving signals including the same position information to two first touch electrodes TX1$a$ and TX1$b$ corresponding to the first touch electrode group TXG1. For example, the distance between the centers of touch electrode groups adjacent to each other may be about 4 mm. The distance between unit areas that sense a touch when the touch driver 120 operates in the touch mode may be about 4 mm.

When the driving mode is the pen mode, the touch driver 120 may apply a signal transferred through one signal line to one touch electrode. For example, the touch driver 120 may apply driving signals including different position information respectively to the two first touch electrodes TX1$a$ and TX1$b$ corresponding to the first touch electrode group TXG1. For example, the distance between the centers of touch electrodes adjacent to each other may be about 2 mm. The distance between unit areas that sense a touch when the touch driver 120 operates in the pen mode may be about 2 mm.

In the touch panel 110, a capacitance may be formed in each of a plurality of touch electrodes. For example, a capacitance may be formed between each of the touch electrodes and a ground or a conductive layer in the touch panel 110. In addition, when a touch of a user is provided to touch electrodes, one or more of capacitances corresponding to the touch electrodes may be changed. A touch input by a finger of a person or a conductive object, such as an active pen, may include at least one of various types of inputs causing a change in capacitance.

As shown in FIG. 4, when the driving mode of the touch driver 120 is the pen mode, the touch driver 120 may generate an uplink signal by applying (e.g., to each touch electrode) a driving signal in a digital signal form, in which different position information are included. For example, the touch driver 120 may apply driving signals to the touch electrodes of the touch panel 110 through signal lines of a first channel CH1.

In embodiments, the touch panel 110 may include a plurality of pads PAD, and the plurality of pads PAD may be respectively connected to first touch electrode lines TXL1$a$, TXL1$b$, TXL2$a$, ..., TXLNa, and TXLNb and second touch electrode lines RXL1$a$, RXL1$b$, ..., RXL(N−1)$b$, RXLNa, and RXLNb. The first touch electrode lines TXL1$a$, TXL1$b$, TXL2$a$, ..., TXLNa, and TXLNb may be connected to respective ones of the first touch electrodes including first touch electrodes TX1a, TX1b, ..., TXNa, and TXNb, and the second touch electrode lines RXL1a, RXL1b, ..., RXLNa, and RXLNb may be connected to respective ones of the second touch electrodes including second touch electrodes RX1a, RX1b, ..., RXNa, and RXNb. Accordingly, the touch driver 120 may apply driving signals in which different position information are included respectively to the first touch electrodes TX1a, TX1b, ..., TXNa, and TXNb and to the second touch electrodes RX1a, RX1b, ..., RXNa, and RXNb through the signal lines of the first channel CH1.

The touch driver 120 may generate each driving signal by encoding different position information. Also, the touch driver 120 may apply each driving signal to a corresponding touch electrode, to transmit the driving signal in the form of an uplink signal to the active pen 200 through a capacitor generated between the active pen 200 and the corresponding touch electrode. For example, uplink signals position information of a touch electrode adjacent to the active pen 200 may be transmitted through a pen capacitor Cpen formed between the active pen 200 and the corresponding touch electrode. The pen capacitor Cpen is not an element having a physical circuit configuration, but may be understood as a virtual element generated as the active pen 200 and a touch electrode of the touch panel 110 are virtually coupled to each other.

Each of the uplink signals received from the active pen 200 may include a digital component representing position information of a touch electrode transmitting the corresponding uplink signal, along with an analog component, according to a capacitance of a capacitor generated between the touch electrode transmitting the corresponding uplink signal and the active pen 200.

The active pen 200 may calculate position information of the active pen 200 by decoding uplink signals received through capacitors generated between adjacent touch electrodes and the active pen 200.

Figure 5:
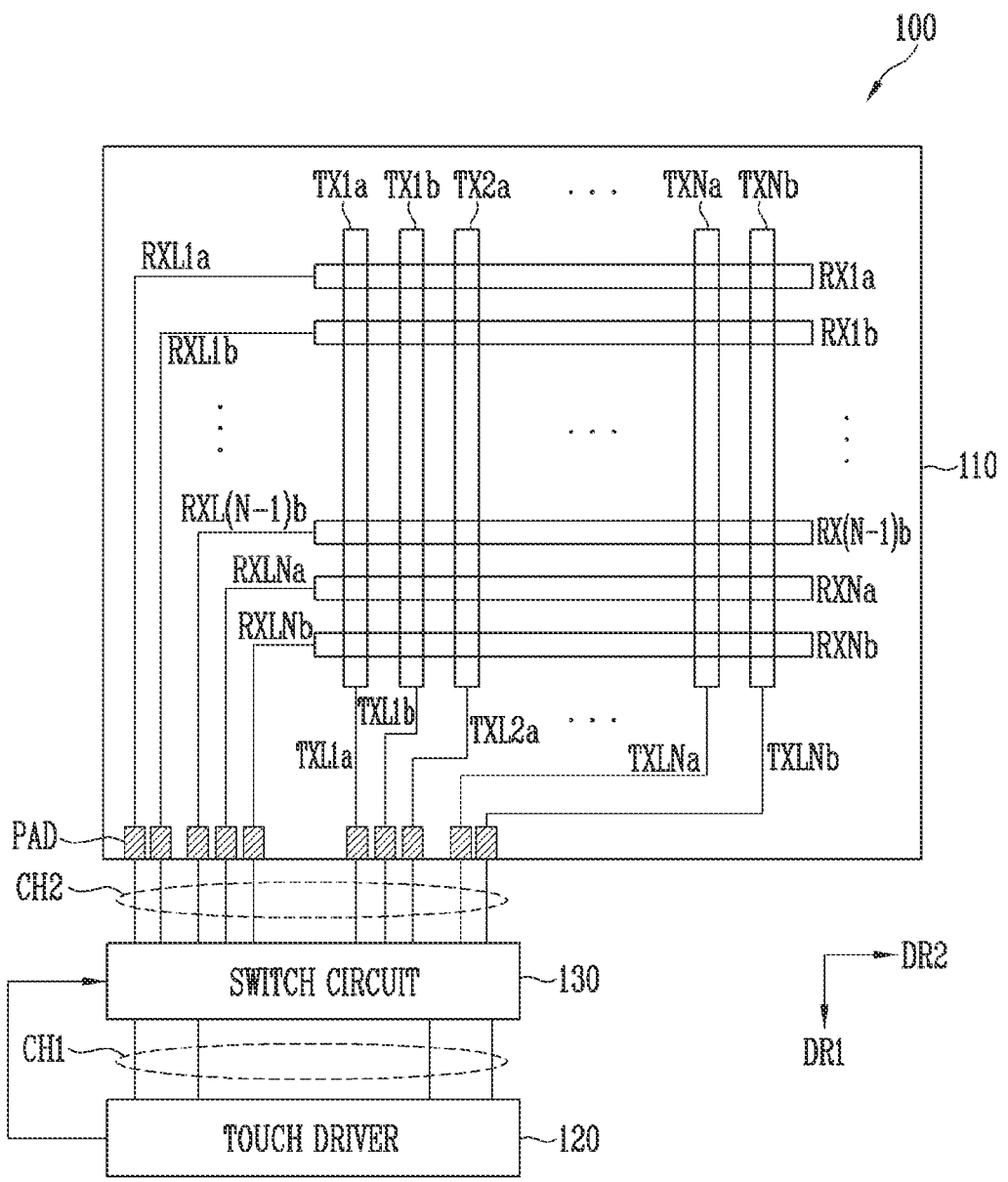
FIG. 5 is a block diagram illustrating still one or more other embodiments of the touch device shown in FIG. 1.

FIG. 5 is a block diagram illustrating still one or more other embodiments of the touch device shown in FIG. 1.

Referring to FIG. 5, a switch circuit 130 for allowing the touch device 100 to operate in the pen mode may be described. When the driving mode is the pen mode, the touch driver 120 may include the switch circuit 130 that selectively applies a signal transferred through one signal line to two or more touch electrodes among the touch electrodes. For example, the switch circuit 130 may include demultiplexer (DEMUX) circuit, and the DEMUX circuit may selectively apply a signal transferred through each signal line to two or more touch electrodes. When the switch circuit 130 is configured as a 1*2 DEMUX circuit, the switch circuit 130 outputs N input signals as $2^N$ output signals, and may provide input signals as some selected from the output signals according to a control signal. For example, the switch circuit 130 configured as the 1*2 DEMUX circuit may increase one input signal to two output signals, and may output the two output signals. The switch circuit 130 may receive a control signal input from the touch driver 120, and may output an input signal provided through the first channel CH1 as driving signals through selected signal lines among signal lines of a second channel CH2 according to the control signal. For example, the touch driver 120 may use the switch circuit 130 to output driving signals to the first touch electrodes TX1a, TX1b, ..., TXNa, and TXNb, and then to output driving signals to the second touch electrodes RX1a, RX1b, ..., RXNa, and RXNb. Besides, the first touch electrodes TX1a, TX1b, ..., TXNa, and TXNb and the second touch electrodes RX1a, RX1b, ... RXNa, and RXNb may be divided into a plurality of groups according to various manners, and the touch driver 120 may provide driving signals for each group unit by using the switch circuit 130. For example, when the switch circuit 130 is implemented as the 1*2 DEMUX circuit, the first touch electrodes TX1a, TX1b, ..., TXNa, and TXNb and the second touch electrodes RX1a, RX1b, ..., RXNa, and RXNb may be divided into two groups. The switch circuit 130 is provided as described above, so that a suitable number of lines between the touch driver 120 and the switch circuit 130 can be decreased.

As shown in FIG. 5, the switch circuit 130 may be separately located between the touch driver 120 and the touch panel 110. For example, driving signals provided from the touch driver 120 through the first channel CH1 may be input to the switch circuit 130. In addition, driving signals output from the switch circuit 130 may be respectively transferred to the plurality of pads PAD through the second channel CH2 to be applied to the first touch electrode lines TXL1a, TXL1b, TXL2a, ..., TXLNa, and TXLNb and the second touch electrode lines RXL1a, RXL1b, ..., RXLNa, and RXLNb.

In other embodiments, the switch circuit 130 may be located between the plurality of pads PAD and the touch electrodes, which are included in the touch panel 110. For example, driving signals provided from the touch driver 120 through the first channel CH1 may be applied to the plurality of pads PAD. In addition, driving signals output from the switch circuit 130 connected to the plurality of pads PAD may be respectively applied to the first touch electrode lines TXL1a, TXL1b, TXL2a, ..., TXLNa, and TXLNb and the second touch electrode lines RXL1a, RXL1b, ..., RXLNa, and RXLNb through the second channel CH2. The switch circuit 130 may be included in the touch panel 110.

Figure 6:
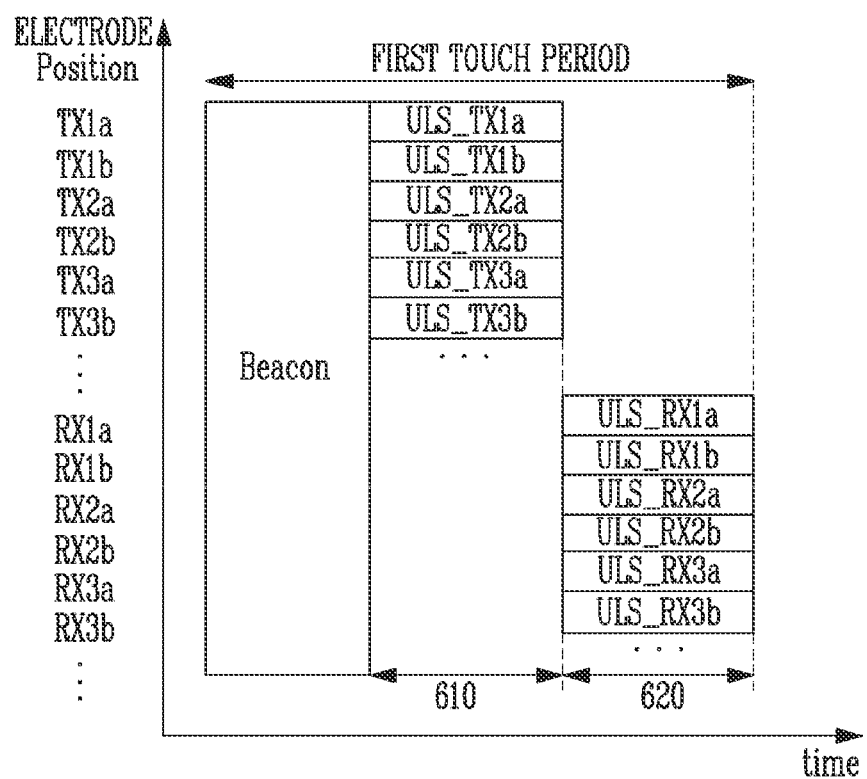
FIGS. 6 to 8 are timing diagrams illustrating embodiments of uplink signals of a first touch period.
Figure 7:
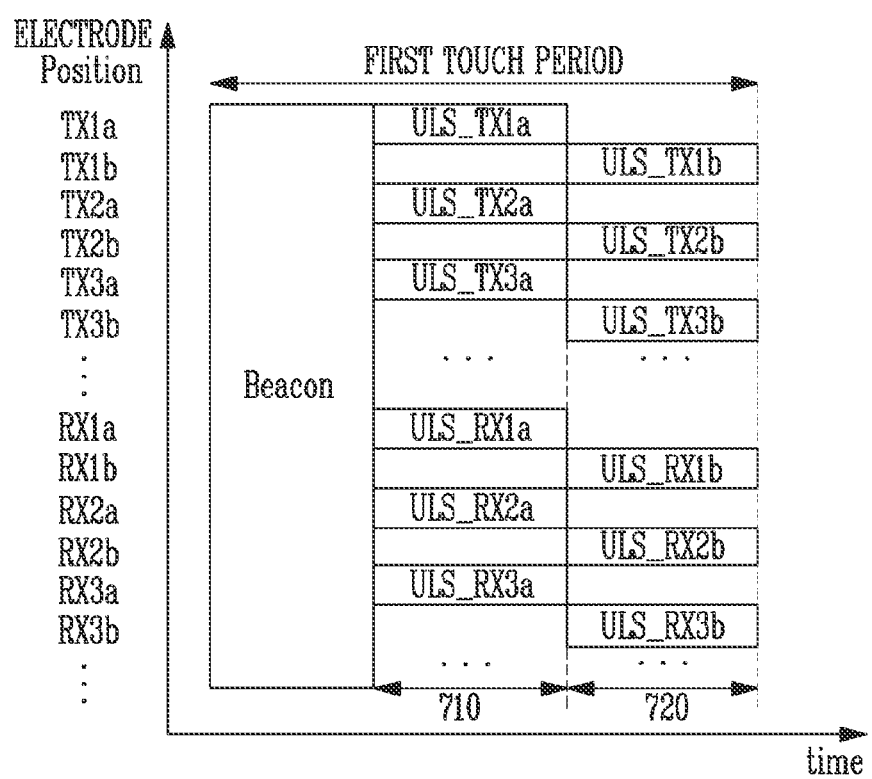
Figure 8:
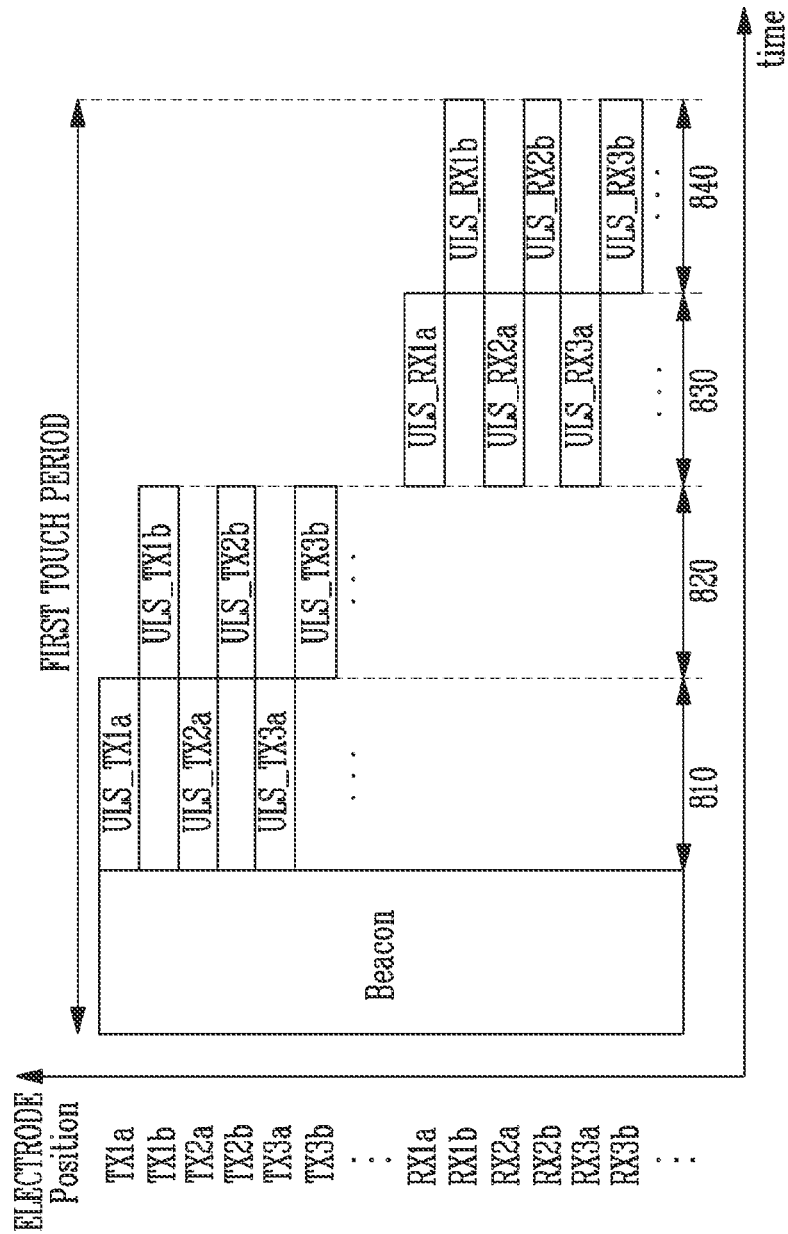

FIGS. 6 to 8 are timing diagrams illustrating embodiments of uplink signals of a first touch period.

In FIGS. 6 to 8, the touch device 100 and the active pen 200 may communicate in units of frames or in units of packets, and a first frame may include a first touch period in which an uplink signal is transmitted, and a second touch period in which a downlink signal is transmitted. A second frame following the first frame may include a first touch period. Also, the second frame may further include a second touch period after the first touch period. As such, the communication between the touch device 100 and the active pen 200 may include a plurality of frames, and each frame may include a first touch period and a second touch period. However, for convenience of description, a first touch period in which an uplink signal is transmitted in a touch period among a plurality of time periods of a frame is exemplarily illustrated. A second touch period will be described in detail with reference to FIG. 12.

For example, in the first touch period, the touch device 100 may transmit a beacon signal as an uplink signal to the active pen 200, and may select a protocol and may control a timing according to the beacon signal. In addition, after the active pen 200 normally receives the beacon signal, the active pen 200 may extract information from the beacon signal. For example, the beacon signal is a signal periodically transmitted from the touch panel 110, and may include at least one of panel information (e.g., panel status information, panel identification information, and the like), driving mode information (e.g., the pen mode and the touch mode), characteristic information of a downlink signal (e.g., a frequency, a voltage level, and the like), switch circuit driving information, and the like. The beacon signal may further include information for driving synchronization between the touch panel 110 and the active pen 200.

Referring to FIGS. 4 and 6, the first touch period may include a first sub-touch period 610 in which uplink signals, which include position information of the first touch electrodes TX1a, TX1b, . . . , TXNa, and TXNb, are transmitted, and also may include a second sub-touch period 720 in which uplink signals, which include position information of the second touch electrodes RX1a, RX1b, . . . , RXNa, and RXNb, are transmitted. The first touch period may be after the period in which the beacon signal is transmitted.

For example, in the first sub-touch period 610, the touch device 100 may transmit (e.g., to the active pen 200) uplink signals ULS_TX1a, ULS_TX1b, . . . , ULS_TXNa, and ULS_TXNb of first touch electrodes respectively corresponding to the first touch electrodes TX1a, TX1b, . . . , TXNa, and TXNb. In addition, in the sub-touch period 620 after the first sub-touch period 610, the touch device 100 may transmit (e.g., to the active pen 200) uplink signals ULS_RX1a, ULS_RX1b, . . . , ULS_RXNa, and ULS_RXNb of second touch electrodes respectively corresponding to the second touch electrodes RX1a, RX1b, . . . , RXNa, and RXNb. Each of the uplink signals may be in the form of an electrical pulse including a digital component representing position information of touch electrodes. That is, each uplink signal may include multiple pulses of different forms.

Referring to FIGS. 4 and 7, the first touch period may include a first sub-touch period 710 in which uplink signals including position information of selected touch electrodes TX1a, TX2a, TX3a, . . . , and TXNa among the first touch electrodes TX1a, TX1b, . . . , TXNa, and TXNb, and of selected touch electrodes RX1a, RX2a, RX3a, . . . , and RXNa among the second touch electrodes RX1a, RX1b, . . . , RXNa, and RXNb, are transmitted. The first touch period also may include a second sub-touch period 720 in which uplink signals including position information of the other touch electrodes TX1b, TX2b, TX3b, . . . , TXNb among the first touch electrodes TX1a, TX1b, . . . , TXNa, and TXNb, and of the other touch electrodes RX1b, RX2b, RX3b, . . . , and RXNb among the second touch electrodes RX1a, RX1b, . . . , RXNa, and RXNb, are transmitted. The first touch period and the second touch period may be after the period in which the beacon signal is transmitted.

For example, in the first sub-touch period 710, the touch device 100 may transmit (e.g., to the active pen 200) uplink signals ULS_TX1a, ULS_TX2a, . . . , ULS_TXNa, ULS_RX1a, ULS_RX2a, . . . , and ULS_RXNa respectively corresponding to the selected touch electrodes TX1a, TX2a, TX3a, . . . , and TXNa among the first touch electrodes TX1a, TX1b, . . . , TXNa, and TXNb and to the selected touch electrodes RX1a, RX2a, RX3a, . . . , and RXNa among the second touch electrodes RX1a, RX1b, . . . , RXNa, and RXNb. In addition, in the second sub-touch period 720 after the first sub-touch period 710, the touch device 100 may transmit (e.g., to the active pen 200) uplink signals ULS_TX1b, ULS_TX2b, . . . , ULS_TXNb, ULS_RX1b, ULS_RX2b, . . . , and ULS_RXNb respectively corresponding to the other touch electrodes TX1b, TX2b, TX3b, . . . , TXNb among the first touch electrodes TX1a, TX1b, . . . , TXNa, and TXNb and to the other touch electrodes RX1b, RX2b, RX3b, . . . , and RXNb among the second touch electrodes RX1a, RX1b, . . . , RXNa, and RXNb.

Referring to FIGS. 4 and 8, the first touch period may include a first sub-touch period 810 in which an uplink signal including position information of selected touch electrodes TX1a, TX2a, TX3a, . . . , and TXNa among the first touch electrodes TX1a, TX1b, . . . , TXNa, and TXNb is transmitted, a second sub-touch period 820 in which an uplink signal including position information of the other touch electrodes TX1b, TX2b, TX3b, . . . , and TXNb among the first touch electrodes TX1a, TX1b, . . . , TXNa, and TXNb is transmitted, a third sub-touch period 830 in which an uplink signal including position information of selected touch electrodes RX1a, RX2a, RX3a, . . . , and RXNa among the second touch electrodes RX1a, RX1b, . . . , RXNa, and RXNb is transmitted, and a fourth sub-touch period 840 in which an uplink signal including position information of the other touch electrodes RX1b, RX2b, RX3b, . . . , and RXNb among the second touch electrodes RX1a, RX1b, . . . , RXNa, and RXNb is transmitted. The first to fourth touch periods 810, 820, 830, and 840 may be after the period in which the beacon signal is transmitted.

For example, in the first sub-touch period 810, the touch device 100 may transmit (e.g., to the active pen 200) uplink signals ULS_TX1a, ULS_TX2a, . . . , and ULS_TXNa of selected first touch electrodes respectively corresponding to the selected touch electrodes TX1a, TX2a, TX3a, . . . , and TXNa among the first touch electrodes TX1a, TX1b, . . . , TXNa, and TXNb. In addition, in the second sub-touch period 820 after the first sub-touch period 810, the touch device 100 may transmit (e.g., to the active pen 200) uplink signals ULS_TX1b, ULS_TX2b, . . . , and ULS_TXNb of the other first touch electrodes respectively corresponding to the other touch electrodes TX1b, TX2b, TX3b, . . . , and TXNb among the first touch electrodes TX1a, TX1b, . . . , TXNa, and TXNb. In the third sub-touch period 830 after the second sub-touch period 820, the touch device 100 may transmit (e.g., to the active pen 200) uplink signals ULS_RX1a, ULS_RX2a, . . . , and ULS_RXNa of selected touch electrodes respectively corresponding to the selected touch electrodes RX1a, RX2a, RX3a, . . . , and RXNa among the second touch electrodes RX1a, RX1b, . . . , RXNa. Further, in the fourth sub-touch period 840 after the third sub-touch period 830, the touch device 100 may transmit (e.g., to the active pen 200) uplink signals ULS_RX1b, ULS_RX2b, . . . , and ULS_RXNb of the other touch electrodes respectively corresponding to the other touch electrodes RX1b, RX2b, RX3b, . . . , and RXNb among the second touch electrodes RX1a, RX1b, . . . , RXNa, and RXNb.

As such, the first touch period may be divided into N sub-touch periods after the period in which the beacon signal is transmitted. In addition, the first touch electrodes and the second touch electrodes may be variously grouped, and uplink signals may be transmitted through touch electrodes of one group in each sub-touch period.

Figure 9:
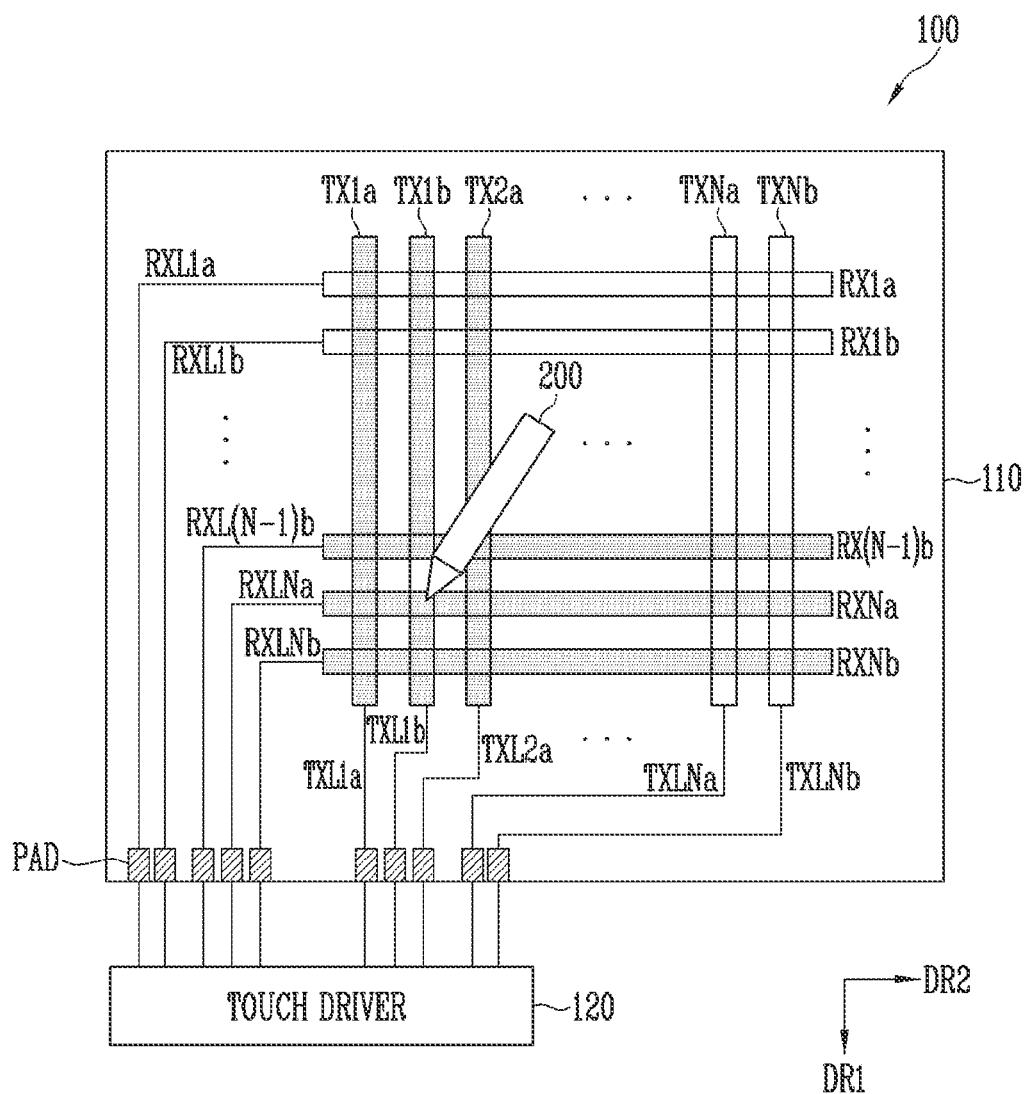
FIG. 9 is a block diagram illustrating touch electrodes selected to transmit uplink signals in a touch panel shown in FIG. 4.

FIG. 9 is a block diagram illustrating touch electrodes selected to transmit uplink signals in the touch panel shown in FIG. 4.

Hereinafter, in FIG. 9, an example of transmitting an uplink signal through a touch electrode selected according to a touch result is described.

In accordance with one or more embodiments, the touch driver 120 may select at least one touch electrode corresponding to a corresponding range with respect to a final position at which a touch is sensed among the touch electrodes, and may transmit uplink signals through the selected touch electrode.

First, in the first touch period, the touch driver 120 may apply driving signals in which different position information are included to all the touch electrodes included in the touch panel 110, such that uplink signals can be transmitted through all the touch electrodes. When the active pen 200 calculates position information of the active pen 200 from the received uplink signals, the active pen 200 may transmit a sensing signal including the position information of the active pen 200 to the touch panel 110 in the second touch period.

In a subsequent frame, the touch driver 120 may select touch electrodes corresponding to a corresponding range with respect to a touch position (or coordinate), and may transmit uplink signals through the selected touch electrodes. For example, in the first touch period, the touch driver 120 may apply corresponding driving signals to only a plurality of touch electrodes corresponding to a range with respect to final position information with which a touch is sensed in a previous frame. Accordingly, uplink signals may be transmitted through the plurality of touch electrodes corresponding to the corresponding range with respect to the final position information with which the touch is sensed in the previous frame. The corresponding range may be a range including a touch electrode corresponding to the final position information with which the touch is sensed and adjacent touch electrodes with respect to the corresponding touch electrode. For example, as driving signals may be applied to only some touch electrodes having a relatively high probability that the touch will be sensed, uplink signals may be transmitted. In addition, the active pen 200 may calculate position information of the active pen 200 by using only uplink signals received from some touch electrodes having a higher probability that the touch will be sensed. As such, uplink signals are output through some touch electrodes having a relatively high probability that the touch will be sensed, so that power consumption can be reduced while improving touch sensing performance.

As shown in FIG. 9, when a touch is sensed in a touch electrode corresponding to a second column of an Nth row at an initial operation time, the touch driver 120 may select touch electrodes of an adjacent column and an adjacent row, along with the corresponding touch electrode, with respect to final position information (TX1b and RXNa) with which the touch is sensed. Also, the touch driver 120 may apply a driving signal to only selected touch electrodes TX1a, TX2a, and TX3a among the first touch electrodes and selected touch electrodes RX(N-1)b, RXNa, and RXNb among the second touch electrodes. However, an example of the corresponding range is merely described, and therefore, the touch driver 120 may select a larger number of adjacent touch electrodes.

Figure 10:
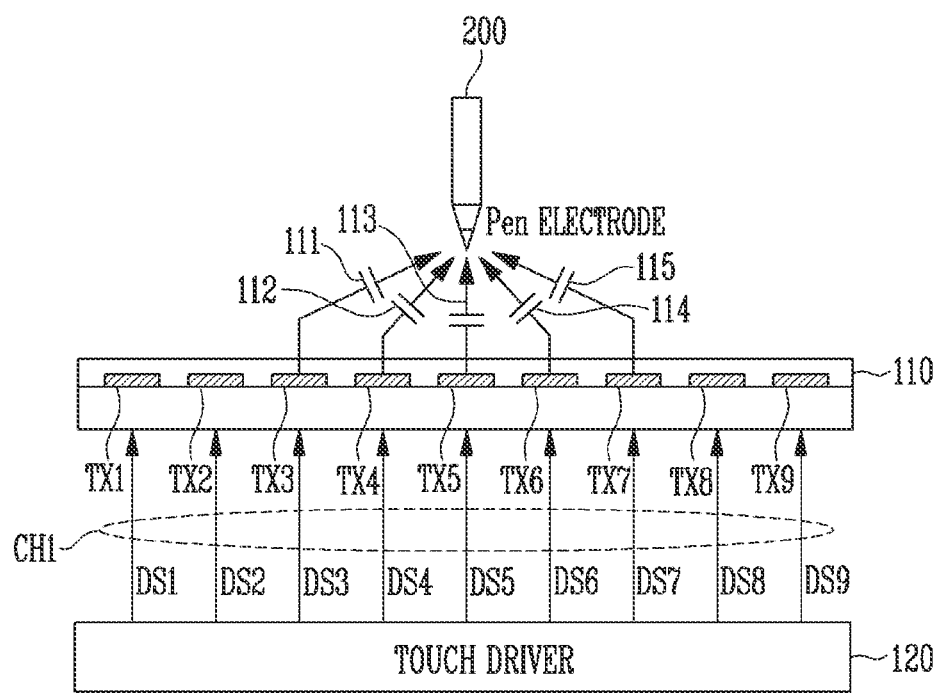
FIG. 10 is a diagram illustrating uplink signals received to the active pen shown in FIG. 1.

FIG. 10 is a diagram illustrating uplink signals received to the active pen shown in FIG. 1.

Referring to FIG. 10, an operation in which the active pen 200 receives uplink signals through capacitors generated between the active pen 200 and adjacent touch electrodes is described.

As shown in FIG. 10, the touch driver 120 may apply driving signals DS1 to DS9 in which different position information are included to first touch electrodes TX1 to TX9 of the touch panel 110 through the first channel CH1. In addition, when the active pen 200 approaches the touch panel 110, the active pen 200 may transmit uplink signals through capacitors generated between the active pen 200 and adjacent touch electrodes TX3 to TX7. Also, the active pen 200 may acquire capacitance information of capacitors 111 to 115 generated in the corresponding touch electrodes from the transmitted uplink signals. For example, capacitance information of a capacitor 111 generated between a first touch electrode TX5 of a fifth column, to which the active pen 200 is most adjacent, and the active pen 200 may be included in an uplink signal transmitted from the first touch electrode TX5 of the fifth column. Digital components for the driving signals DS1 to DS9 in which different position information are included, along with analog components for capacitance information of the capacitors 111 to 115, may be included in the uplink signals transmitted from the adjacent touch electrodes TX3 to TX7, respectively.

In one or more embodiments, the sensing driver 220 of the active pen 200 may decode the uplink signals received from the adjacent first touch electrodes TX3 to TX7, and may calculate position information of the active pen 200 by applying an algorithm (e.g., a predetermined algorithm). The position information of the active pen 200 may be calculated from the digital components included in the driving signals DS1 to DS9. For example, the sensing driver 220 may calculate the position information of the active pen 200 by estimating eigenvectors from the decoded uplink signals, and by allocating a relative weighted value (e.g., a predetermined relative weighted value) to each of the eigenvectors.

However, although a case where the first touch electrodes shown in FIG. 10 are configured as nine first touch electrodes TX1 to TX9 has been described as an example, the present disclosure is not limited to the number of first touch electrodes. In addition, the descriptions of the first touch electrodes may be equally applied to the second touch electrodes RX1 to RXN.

Figure 11:
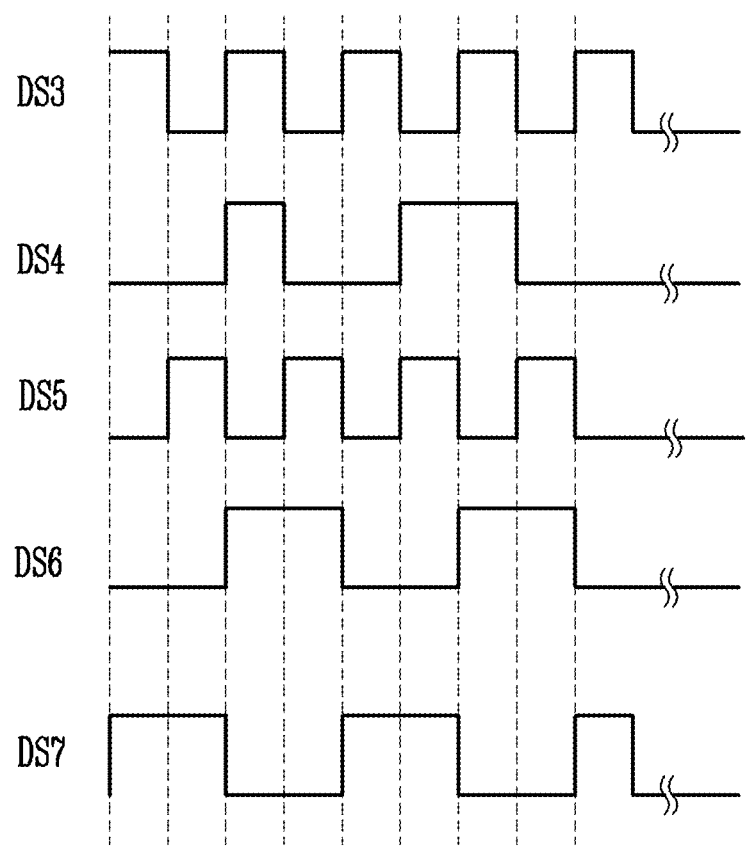
FIG. 11 is a timing diagram illustrating an example of a signal applied to each touch electrode shown in FIG. 10.

FIG. 11 is a timing diagram illustrating an example of a signal applied to each touch electrode shown in FIG. 10.

Referring to FIG. 11, driving signals DS3 to DS7 respectively applied to the first touch electrodes TX3 to TX7, to which the active pen 200 shown in FIG. 10 is adjacent, are described. The driving signals may be signals of digital components, which are generated by performing encoding and modulation, based on different position information. The driving signals may be different forms of pulse signals including 1 or 0 in a plurality of bit streams. For example, a driving signal DS3 applied to a first touch electrode TX3 located on a third column may be a signal of a digital component, which includes 101010101. A driving signal DS4 applied to a first touch electrode TX4 located on a fourth column may be a signal of a digital component, which includes 00100100. A driving signal DS5 applied to a first touch electrode TX5 located on a fifth column may be a signal of a digital component, which includes 010101010. A driving signal DS6 applied to a first touch electrode TX6 located on a sixth column may be a signal of a digital component, which includes 001100110. A driving signal DS7 applied to a first touch electrode TX7 located on a seventh column may be a signal of a digital component, which includes 110011001. However, although an example in which the driving signals include different position information is described, the present disclosure is not limited thereto.

Figure 12:
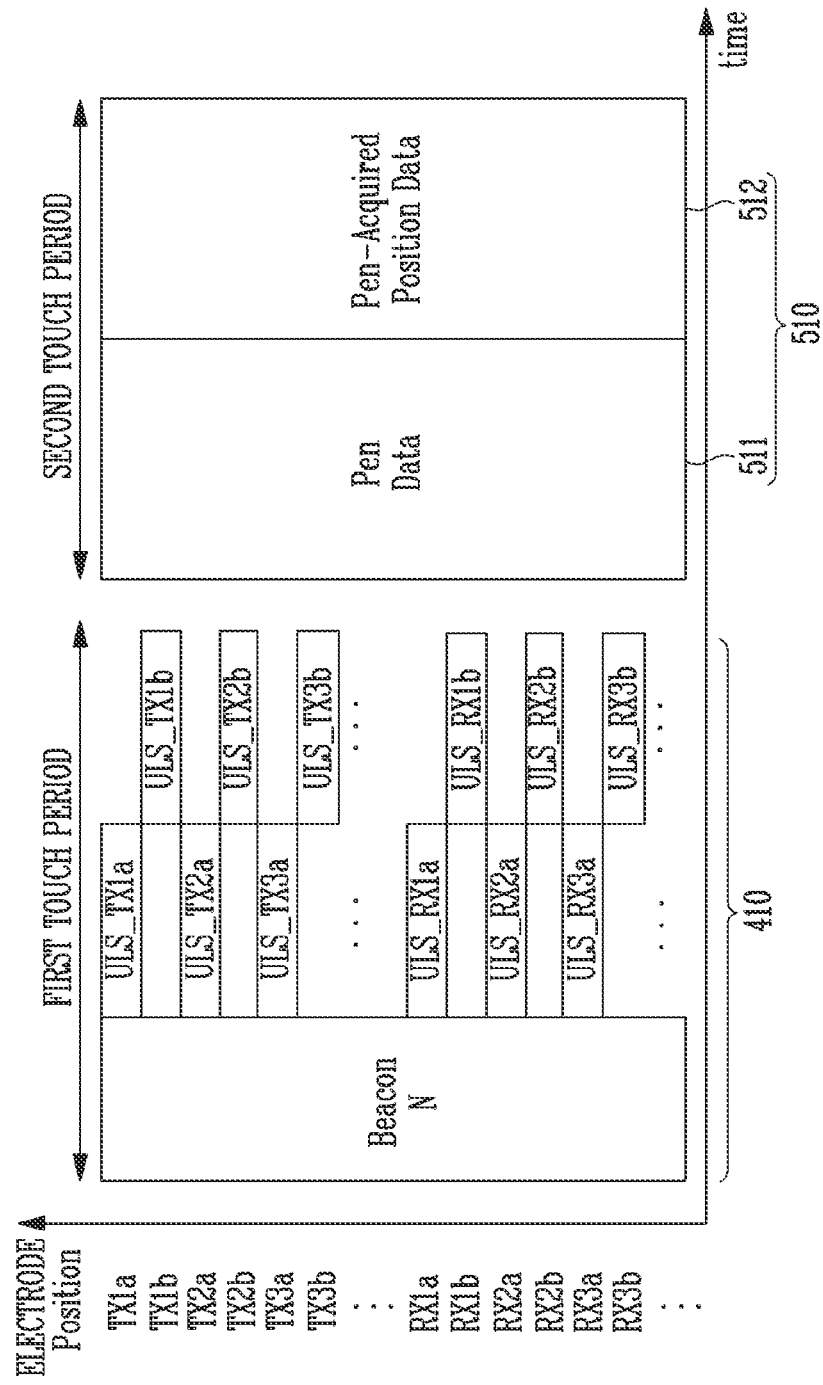
FIG. 12 is a timing diagram illustrating an example of an uplink signal of the first touch period and a sensing signal of a second touch period.

FIG. 12 is a timing diagram illustrating an example of an uplink signal of a first touch period and a sensing signal of a second touch period.

Referring to FIG. 12, communication between the touch device 100 and the active pen 200 may include a plurality of frames, and each frame may include a first touch period in which uplink signals are transmitted, and a second touch period in which a downlink signal is transmitted.

As shown in FIG. 12, uplink signals 410 may be transmitted to the active pen 200 through the touch panel 110 in the first touch period, and a sensing signal 510 may be transmitted from the active pen 200 through the touch panel 110 in the second touch period after the first touch period.

For example, the sensing driver 220 of the active pen 200 may calculate position information 512 of the active pen by using the received uplink signals. In addition, in the second touch period, the sensing driver 220 of the active pen 200 may transmit (e.g., to the touch device 100) sensing information including the position information 512 of the active pen as a downlink signal. The downlink signal may be transmitted through capacitors generated between touch electrodes adjacent to the active pen 200.

The sensing signal 510 may include pen information 511 of the active pen, and the position information 512 of the active pen. For example, the pen information 511 of the active pen may include at least one of status information (e.g., strength, pressure, and slope) of the active pen, button information, battery information, information for error check and correction, and the like. In addition, the position information 512 of the active pen may be calculated from digital components separated by decoding the received uplink signals, and by applying the decoded uplink signals to an algorithm (e.g., a predetermined algorithm).

In another example, in the second touch period, the sensing driver 220 of the active pen 200 may transmit a sensing signal including the calculated position information of the active pen to the touch device 100 through the host using a Bluetooth® wireless technology scheme or a Bluetooth® Low Energy (BLE) wireless technology scheme. That is, the active pen 200 may upload the sensing signal to the host through the Bluetooth® wireless technology scheme, and the uploaded sensing signal may be transmitted to the touch device 100 from the host through a cable.

Figure 13:
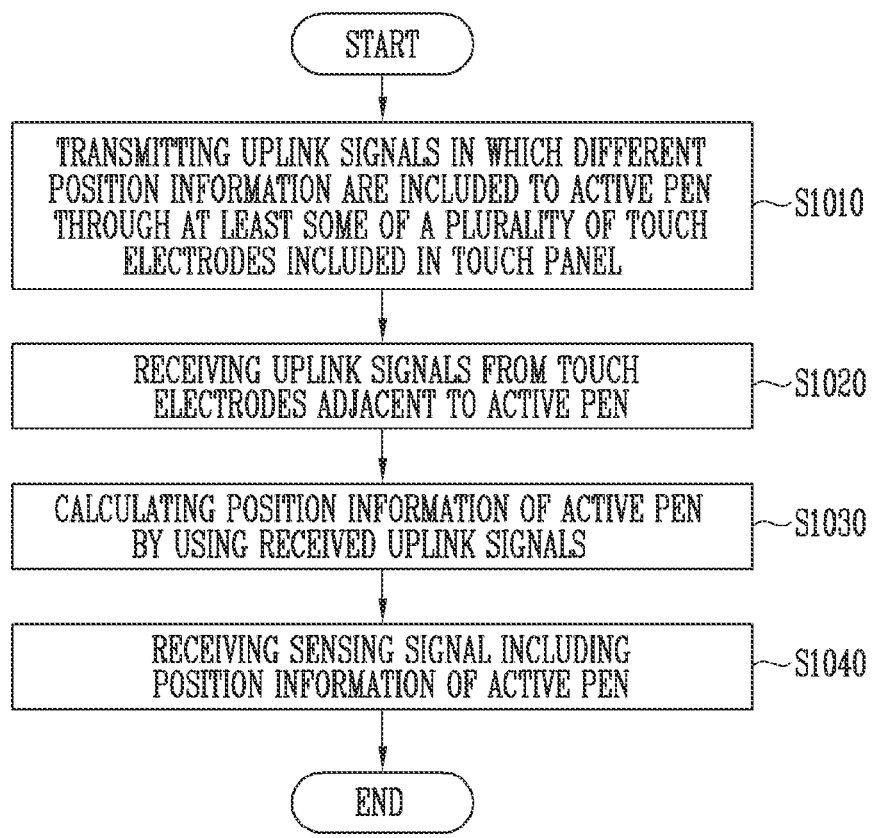
FIG. 13 is a flowchart illustrating a method of driving the touch system in accordance with one or more embodiments of the present disclosure.

FIG. 13 is a flowchart illustrating a method of driving the touch system in accordance with one or more embodiments of the present disclosure. Hereinafter, a method is described in FIG. 13 in which the touch device transmits uplink signals to the active pen, and receives a sensing signal from the active pen, thereby sensing a touch.

Referring to FIGS. 1 and 13, in operation S1010, the touch device 100 may transmit uplink signals in which different position information are included to the active pen 200 through at least some of a plurality of touch electrodes included in the touch panel. For example, when the driving mode is the pen mode, the touch driver may transmit (e.g., to the active pen 200) uplink signals generated by encoding position information of each of first touch electrodes and second touch electrodes in a first touch period.

In operation S1020, the active pen 200 may receive uplink signals from touch electrodes adjacent to the active pen 200. For example, the active pen 200 may receive the uplink signals through capacitors generated between the active pen 200 and the adjacent touch electrodes. Each of the received uplink signals may include a digital component representing position information of a touch electrode transmitting a corresponding uplink signal, and also may include an analog component, according to capacitance information of a capacitor generated between the touch electrode transmitting the corresponding uplink signal and the active pen 200.

In operation S1030, the active pen 200 may calculate position information of the active pen 200 by using the received uplink signals. For example, the position information of the active pen 200, with which a touch is sensed, may be calculated by decoding the received uplink signals, and by applying the decoded uplink signals to an algorithm (e.g., a predetermined algorithm).

In embodiments, the steps S1020 and S1030 may be performed by the active pen 200 shown in FIG. 1.

In operation S1040, the touch device 100 may receive a sensing signal including the position information of the active pen 200. For example, the touch driver may receive the sensing signal including the position information of the active pen 200 through the first touch electrodes and the second touch electrodes in a second touch period after the first touch period. The sensing signal may be transmitted as a downlink signal directly to the touch device 100 from the active pen 200, or may be transmitted to the touch device 100 through the host 300, using a Bluetooth® wireless technology scheme or a Bluetooth® Low Energy (BLE) wireless technology scheme.

Figure 14:
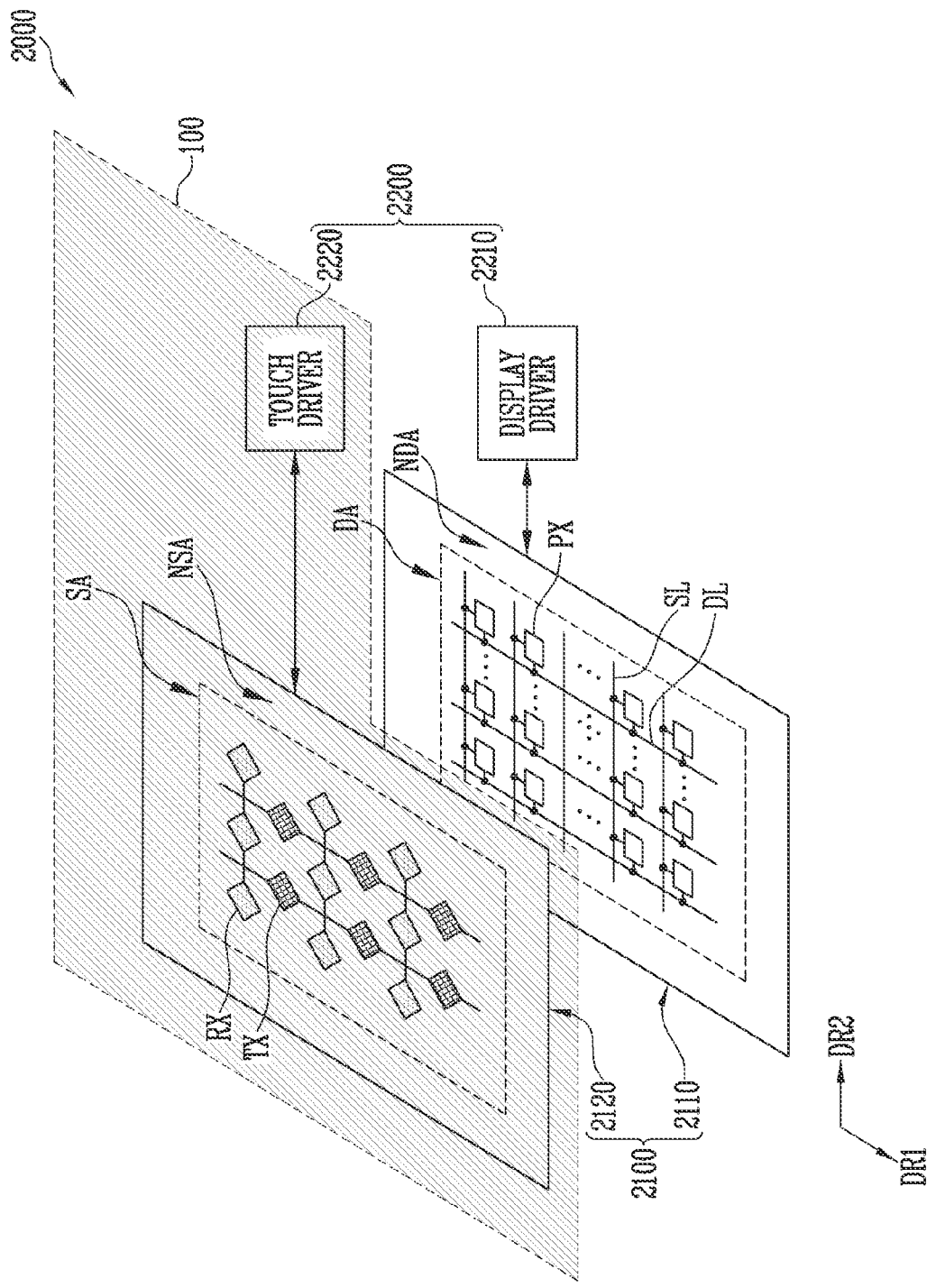
FIG. 14 is a block diagram illustrating one or more embodiments of a display device including the touch device shown in FIG. 2.

FIG. 14 is a block diagram illustrating one or more embodiments of a display device including the touch device shown in FIG. 2.

Referring to FIG. 14, a display device 2000 may include a panel 2100, and a panel driver 2200 for driving the panel 2100.

The panel 2100 may include a display panel 2110, and a touch panel 2120 overlapping with the display panel 2110.

In embodiments, after the display panel 2110 and the touch panel 2120 are manufactured separately from each other, the display panel 2110 and the touch panel 2120 may be coupled to at least partially overlap with each other. In other embodiments, the display panel 2110 and the touch panel 2120 may be integrally manufactured. The touch panel 2120 may be formed directly on at least one layer constituting the display panel 2110 (e.g., an upper substrate), a thin film encapsulation, or an insulating layer of the display panel 2110.

In FIG. 14, it is illustrated that the touch panel 2120 is located above the display panel 2110. However, the touch panel 2120 is not limited thereto. For example, the touch panel 2120 may be located under the display panel 2110.

The display panel 2110 may include a display area DA for displaying an image, and a non-display area NDA at the periphery of the display area DA. The non-display area NDA may at least partially surround the display area DA. The display panel 2110 may include pixels PX formed on a substrate. The pixels PX may be located in the display area DA. In embodiments, the substrate may be a rigid substrate including a material, such as glass or tempered glass. In other embodiments, the substrate may be a flexible substrate including a material, such as plastic or metal.

The pixels PX may be connected to driving lines SL and data lines DL. The pixels PX may be selected by a driving signal having a turn-on level, which is supplied through the driving lines SL, and may receive data signals through the data lines DL. Accordingly, the pixels PX emit light with luminances corresponding to the data signals, and an image is displayed in the display area DA.

Lines and/or a built-in circuit that is connected to the pixels PX may be located in the non-display area NDA. For example, a scan driver may be further located in the non-display area NDA.

In embodiments, the display panel 2110 may include, as the pixels PX, organic light emitting diodes, inorganic light emitting diodes, quantum dot/well light emitting diodes, and the like. In other embodiments, the display panel 2110 may be implemented as a liquid crystal display panel. The display device 2000 may additionally include a light source, such as a back-light unit.

The touch panel 2120 may include an active area SA capable of sensing a touch, and a non-active area NSA at the periphery of the active area SA. The active area SA may at least partially overlap with the display area DA.

The touch panel 2120 may include a substrate, and scan electrodes TX and sensing electrodes RX that are formed on the substrate. The scan electrodes TX and the sensing electrodes RX may be located in the active area SA on the substrate. In embodiments, the substrate may be a rigid substrate including a material, such as glass or tempered glass. In other embodiments, the substrate may be a flexible substrate including a material, such as plastic or metal. In embodiments, at least one layer constituting the display panel 2110 may be used as the substrate of the touch panel 2120.

The touch panel 2120 may be implemented as the touch panel 110 shown in FIG. 2.

The panel driver 2200 may include a display driver 2210 for driving the display panel 2110 and a touch driver 2220 for driving the touch panel 2120. In embodiments, the display driver 2210 and the touch driver 2220 may be configured as integrated chips (ICs) separate from each other. In other embodiments, the display driver 2210 and the touch driver 2220 may be mounted in one IC.

The display driver 2210 may be electrically connected to the display panel 2110 to drive the pixels PX. For example, the display driver 2210 may include a data driver connected to the data lines DL, a scan driver connected to the driving lines SL, and a timing controller for controlling the data driver and the scan driver. In another example, the display driver 2210 may include the data driver and the timing controller, and the scan driver may be located in the non-display area NDA of the display panel 2110.

The touch driver 2220 may be connected to the touch panel 2120 to drive the touch panel 2120. The touch driver 2220 may be implemented including the touch driver 120 shown in FIG. 2.

The display driver 2210 may display an image on the display panel 2110 by using a display frame as a unit. The touch driver 2220 may sense a touch by using a sensing frame as a unit. For example, during a sensing frame, the touch driver 2220 may transmit uplink signals to an active pen from touch electrodes, and may receive a sensing signal including position information of the active pen from the active pen, thereby sensing a touch of a user. A sensing frame period and a display frame period may be synchronized with each other, or may be asynchronized.

In an example, the display device 2000 may be employed in electronic devices, such as a computer, a notebook computer (laptop), a cellular phone, a smart phone, a Personal Digital Assistant (PDA), a Portable Multimedia Player (PMP), a digital TV, a digital camera, a portable game console, a navigation device, a wearable device, an Internet of Things (IoT) device, an Internet of Everything (IoE) device, an electronic-book (e-book), a virtual reality (VR) device, an augmented reality (AR) device, a vehicle navigation system, a video phone, an observation system, an auto-focus system, a tracking system, and a movement sensing system.

In accordance with the present disclosure, there can be provided a touch device and a touch system, which can recognize an active pen with improved reliability.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with any embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, with functional equivalents thereof to be included therein.

What is claimed is:

1. A touch device comprising:
a touch panel including touch electrodes; and
a touch driver adjacent to the touch panel, configured to sense a touch of a user, configured to transmit uplink signals comprising position information of the touch electrodes to an active pen through at least some of the touch electrodes in a first touch period, configured to receive a sensing signal comprising position information of the active pen, which is calculated using the uplink signals, from the active pen in a second touch period after the first touch period, configured to determine a final position at which the touch is sensed in a previous frame, the final position corresponding to a crossing region of a row electrode and a column electrode, and configured to dynamically select two or more of the touch electrodes comprising an adjacent row electrode that is adjacent to the row electrode and an adjacent column electrode that is adjacent to the column electrode to transmit the uplink signals from the two or more of the touch electrodes excluding others of the touch electrodes that are different from the two or more of the touch electrodes.

2. The touch device of claim 1, wherein the touch electrodes comprise first touch electrodes extending in a first direction, and second touch electrodes extending in a second direction, and
wherein the touch driver is configured to generate the uplink signals by encoding position information of the first touch electrodes and the second touch electrodes.

3. The touch device of claim 1, wherein the touch driver is further configured to transmit the uplink signals through the touch electrodes.

4. The touch device of claim 1, wherein a driving mode of the touch driver comprises a pen mode and a touch mode, and
wherein the touch device comprises a switch circuit configured to selectively apply a signal transferred through one signal line to two or more of the touch electrodes during the pen mode.

5. The touch panel of claim 4, wherein the touch panel comprises pads connected to the touch electrodes, and
wherein the switch circuit is located between the pads and the touch electrodes.

6. The touch device of claim 1, wherein a driving mode of the touch driver comprises a pen mode and a touch mode,
wherein the touch electrodes comprise touch electrode groups, and
wherein the touch device comprises a switch circuit configured to selectively connect respective touch electrodes of the touch electrode groups to each other according to a change in the driving mode.

7. The touch device of claim 1, wherein the sensing signal further comprises pen information of the active pen, and is configured to be transmitted from the active pen to the touch driver using a Bluetooth® wireless technology scheme.

8. The touch device of claim 1, wherein the sensing signal further comprises pen information of the active pen, and is configured to be transmitted as a downlink signal from the active pen to the touch driver through the touch electrodes.

9. A touch system comprising:
a touch device comprising a touch panel comprising touch electrodes, and a touch driver adjacent the touch panel and configured to sense a touch of a user; and an active pen configured to communicate with the touch device through the touch panel, wherein the touch driver is configured to transmit an uplink signal comprising position information to the active pen through at least some of the touch electrodes in a first touch period, is configured to receive a sensing signal comprising position information of the active pen from the active pen in a second touch period after the first touch period, configured to determine a final position at which the touch is sensed in a previous frame, the final position comprising a crossing region of a row electrode and a column electrode, and is configured to dynamically select two or more of the touch electrodes comprising an adjacent row electrode that is adjacent to the row electrode and an adjacent column electrode that is adjacent to the column electrode to transmit the uplink signals from the two or more of the touch electrodes excluding others of the touch electrodes that are different from the two or more of the touch electrodes, and wherein the active pen further comprises a sensing driver configured to calculate the position information of the active pen by using the uplink signal received through capacitors generated between at least some of the touch electrodes and the active pen.

10. The touch system of claim 9, wherein the touch driver is configured to generate the uplink signal by encoding position information of first touch electrodes and second touch electrodes, wherein the uplink signal is configured to be received from respective ones of the touch electrodes adjacent to the active pen, and wherein the sensing driver is configured to calculate the position information of the active pen by decoding the uplink signal.

11. The touch system of claim 10, wherein the uplink signal comprises a digital component representing position information of one of the touch electrodes transmitting a corresponding uplink signal and an analog component according to capacitance information of a capacitor between the one of the touch electrodes and the active pen.

12. The touch system of claim 11, wherein the sensing driver is configured to calculate the position information of the active pen by separating the digital component and the analog component from each other using an algorithm.

13. The touch system of claim 9, wherein a driving mode of the touch driver comprises a pen mode and a touch mode, and wherein the touch system comprises a switch circuit configured to selectively apply a signal transferred through one signal line to two or more of the touch electrodes during the pen mode.

14. The touch system of claim 9, wherein the sensing signal comprises position information of the active pen and pen information of the active pen, and wherein the sensing driver is configured to transmit the sensing signal using a Bluetooth® wireless technology scheme.

15. A method of driving a touch device, the method comprising:

in a first touch period, transmitting uplink signals comprising position information to an active pen through at least some of touch electrodes of a touch panel; and in a second touch period after the first touch period, receiving position information of the active pen, which is calculated using the uplink signals, from the active pen; and dynamically selecting two or more of the touch electrodes based on a final position at which a touch is sensed in a previous frame, the final position comprising a crossing region of a row electrode and a column electrode, the two or more of the touch electrodes comprising an adjacent row electrode that is adjacent to the row electrode and an adjacent column electrode that is adjacent to the column electrode, and transmitting the uplink signals from only the selected two or more of the touch electrodes, wherein the position information of the active pen is calculated using the uplink signals received through capacitors generated between the at least some of the touch electrodes and the active pen.

* * * * *